United States Patent [19]

Shiomi et al.

[11] Patent Number: 4,624,608
[45] Date of Patent: Nov. 25, 1986

[54] PILOT PIN-LOCKING DEVICE IN DRILLING MACHINES

[75] Inventors: Iwaji Shiomi; Toshio Mikiya, both of Tokyo, Japan

[73] Assignee: Nitto Kohki Co., Ltd., Japan

[21] Appl. No.: 750,465

[22] Filed: Jul. 1, 1985

Related U.S. Application Data

[63] Continuation of Ser. No. 486,637, Apr. 20, 1983, abandoned.

[30] Foreign Application Priority Data

Apr. 21, 1982 [JP] Japan .................................. 57-56846

[51] Int. Cl.⁴ .............................................. B23B 51/04
[52] U.S. Cl. .......................................... 408/56; 408/68; 408/204; 408/209
[58] Field of Search .................. 408/56, 57, 59, 67, 408/68, 201, 204, 207, 208, 209, 214, 703, 14; 279/20

[56] References Cited

U.S. PATENT DOCUMENTS

| | | | |
|---|---|---|---|
| 3,577,808 | 5/1971 | Visser | 408/61 |
| 4,090,804 | 5/1978 | Haley | 408/204 |
| 4,204,783 | 5/1980 | Hougen | 408/204 |
| 4,385,853 | 5/1983 | Strange et al. | 408/68 |

Primary Examiner—Gil Weidenfeld
Assistant Examiner—Daniel W. Howell
Attorney, Agent, or Firm—Welsh & Katz, Ltd.

[57] ABSTRACT

A pilot pin-locking means for a drilling machine including a drilling tool, a hollow shaft for supporting the drilling tool and provided with a lubricating means, a bearing means mounted on the drilling machine, the shaft being supported by the bearing means for vertical movement and rotation about an axis, further including a pilot pin inserted through the center of the drilling tool for vertical movement.

The hollow shaft receives an engaging means that engages the pilot pin under the resilient action of a spring in a vertically movable manner. The engaging means is detachably locked to and biased against the inner face of the hollow shaft.

4 Claims, 5 Drawing Figures

PILOT PIN-LOCKING DEVICE IN DRILLING MACHINES

This is a continuation of application Ser. No. 486,637, filed Apr. 20, 1983, now abandoned.

The present invention relates to a pilot pin-locking device designed for use in drilling machines.

BACKGROUND OF THE INVENTION

In drilling, a lubricating oil is generally applied over that portion of a workpiece to be drilled in order to reduce friction between the workpiece and the drilling tool or bit and improve workability. For accurate drilling, the center of the cutter is generally aligned with a punch mark previously set on the workpiece to mark the exact location desired to be drilled.

Prior art drilling tools, as generally depicted in FIG. 5, utilize a hollow shaft 4 for supporting an annular cutter 3 over a workpiece 1. Engaging member 6 abuts the upper end of a pilot pin 5 which is initially mounted within cutter 3 in a vertically movable manner. When the cutter 3 is lowered toward the workpiece 1, there is a change in the distance L between an engaging member 6 and pin 9 horizontally fixed to an outer cylinder 8 passing through hollow shaft 4 and supported by bearing member 7. Such a change does not permit the pin 9 to act on a spring 10, so that the spring 10 temporarily loses its resilient force. Without the force of the spring 10 to bias it against pin 9, it is difficult to maintain engagement of the lower end of the pilot pin 5 within the punch mark 2 provided on the workpiece. Consequently, the pilot pin 5 may readily disengage the mark 2. Unsatisfactory engagement or entire disengagement of the pilot pin 5 causes cutting oil (not shown) to flow down onto the workpiece through groove 11 of the pilot pin in the form of droplets. Such oil droplets have to be wiped away, leading to troublesome alignment of the pilot pin 5 with the punch mark and wasteful use of the cutting oil.

In view of the above-mentioned disadvantages of conventional drilling machines, the present invention has for its object, the prevention of disengagement of the pilot pin for more accurate and facile drilling. A further object of the subject invention is the prevention of oil leakage prior to drilling while facilitating the alignment of the pilot pin within the punch mark.

DESCRIPTION OF A PREFERRED EMBODIMENT

One preferred embodiment of the present invention will now be explained with reference to the drawings.

Figure 1:
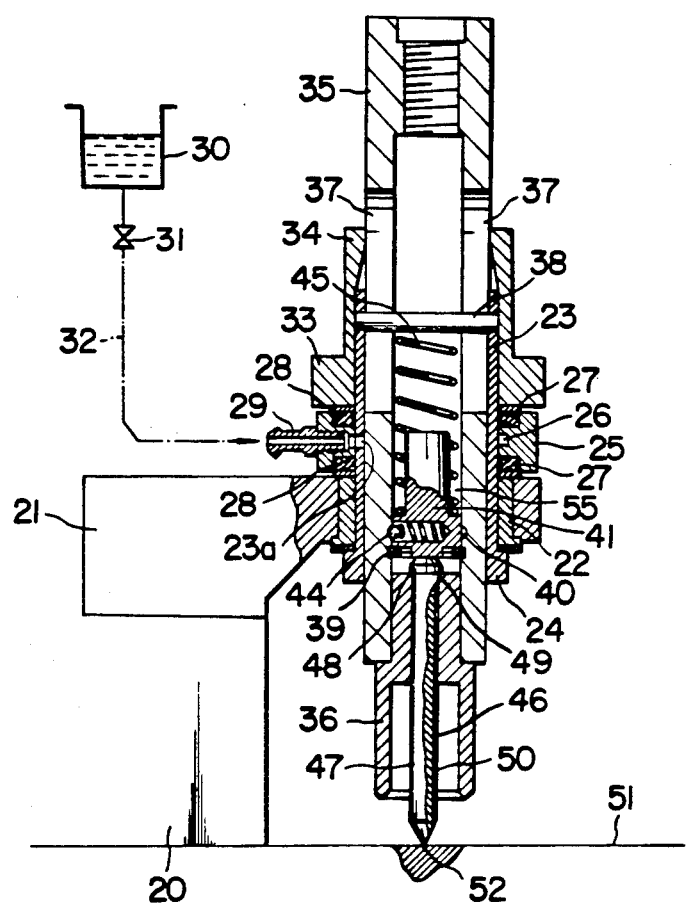
FIG. 1 is a cross-sectional view showing one embodiment of the present invention.
Figure 3:
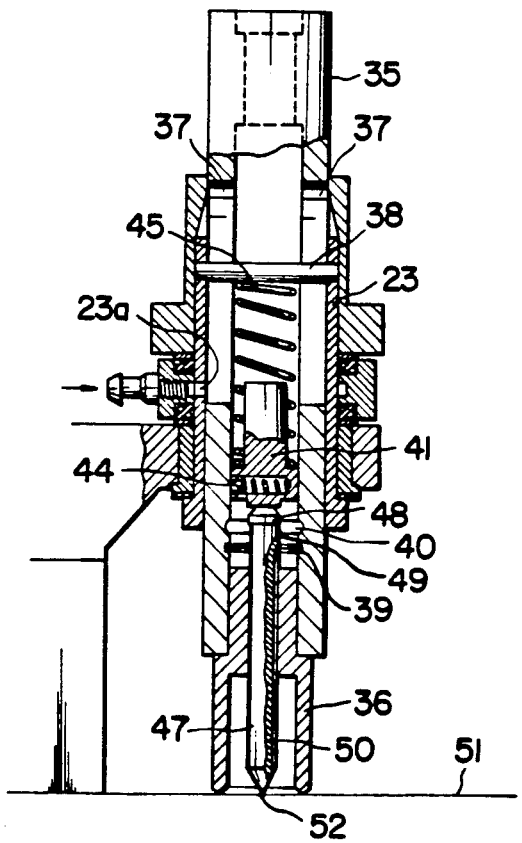
FIG. 3 is a cross-sectional view of the embodiment of FIG. 1 showing the oil opening in an open state.
Figure 4:
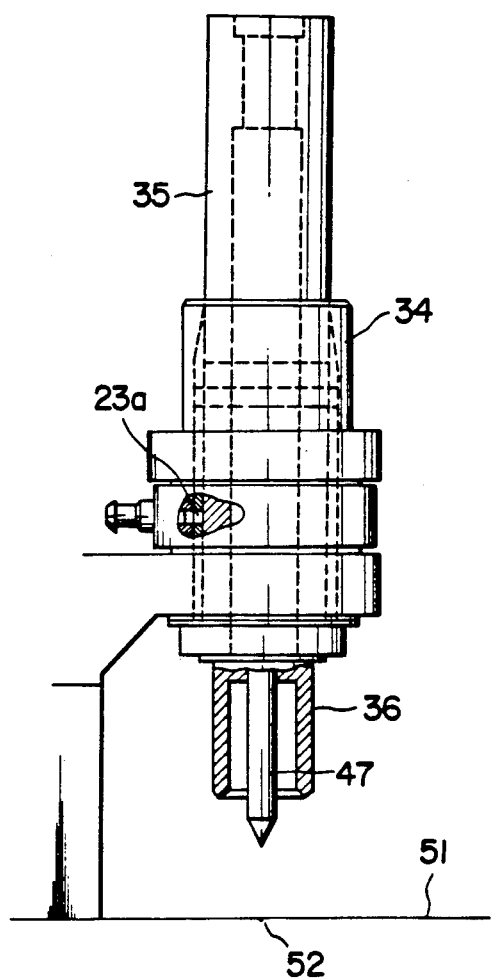
FIG. 4 is a cross-sectional view of the embodiment of FIG. 1 showing the oil opening in a closed state.
Figure 5:
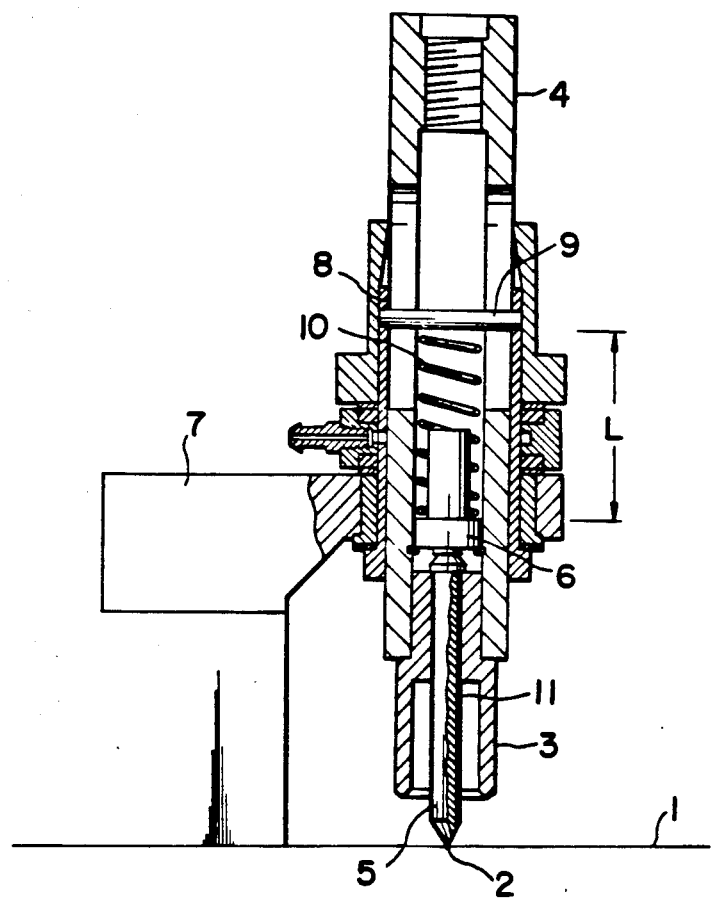
FIG. 5 is a cross-sectional view showing a portion of a drilling machine representative of the prior art.

Referring now to FIG. 1, a bearing member 21 is shown mounted on a front end of an electromagnet 20 which is attached to the lower end of a drill stand (not illustrated). A bearing member 23 rotatably supports an outer cylinder 21 through a vertically disposed collar cylinder 22. A collar member 24 is provided around the lower outside of the outer cylinder 23, and an annular lubricator means 25 is positioned above the collar cylinder 22. The annular lubricator 25 is provided with an internal intermediate groove 26 and with upper and lower internal grooves 27. Seals 28 are placed within the latter grooves. Intermediate groove 26 communicates with the interior oil reservoir 55 within the hollow shaft 35 through an opening in the hollow shaft wall, which comes into registry with groove 26 and oil feed opening 23a when the hollow shaft is in the lower or operative position (FIG. 3). Reference numeral 29 refers to a cylindrical opening or mouth attached to the annular lubricator 25 for communication with internal groove 26 and oil feed opening 23a. A lubricating oil tank 30 may be located above annular lubricator 25 and coupled to the cylindrical opening 29 through stop valve 31 by hose 32. An ejector collar holder 33 is positioned above the annular lubricator 25 and secured to the outer cylinder 23. Hollow shaft 35 has an external cylindrical cover 34 which may be formed integrally with the holder 33.

The hollow shaft 35 is connected at its upper end with a drill motor (not shown) via a drilling spindle, which is fixedly secured at its lower end to a drilling tool such as drill or annular cutter 36. A pair of elongate slots 37 are provided in the intermediate side wall of the hollow shaft 35. A pin 38 is fixed at both ends within upper portion of the outer cylinder 23, so that the outer cylinder 23 may rotate in unison with the hollow shaft 35. A locking or sealing ring 39 is positioned somewhat above the annular cutter 36 and locked within the hollow shaft 35. A depression, such as an annular groove 40, is located in the inner face of the hollow shaft above locking ring 39. Internal engaging member 41 is vertically movable within hollow shaft 35 with its lower extremity engaged with the sealing ring 39. Above engaging member 41 is oil reservoir 55. Oil is permitted to flow from oil reservoir past the engaging member for use as will be described.

Figure 2:
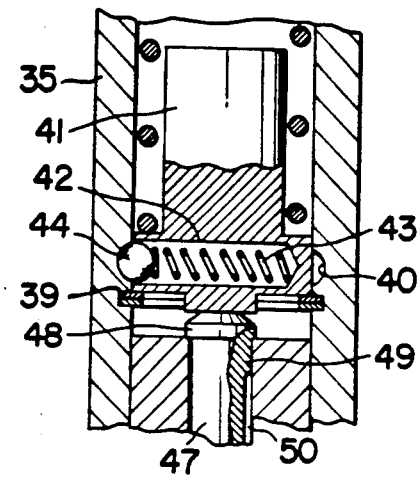
FIG. 2 is an enlarged cross-sectional view showing a central portion of the embodiment of FIG. 1 in greater detail.

As best shown in FIG. 2, a blind hole or cavity 42 is provided in the lower portion of the engaging member 41, with the hole 42 extending horizontally from its one end. The blind hole 42 receives a ball 44 under the resilient action of a spring 43, for detachable engagement of the ball within internal groove 40, when aligned therewith.

FIG. 1 shows spring 45 for forcing down the pilot pin 47 to be interposed between the upper face of engaging member 41 and pin 38. The pilot pin 47 is inserted through an opening provided in the center of the drilling tool 36 for vertical movement therein. Pilot pin 47 has locking member 48 on an upper portion, and an oil passage groove 50 in its sidewall extending from an uppermost grooveless portion 49 positioned just below locking member 48 to the lower tip of the pilot pin.

The foregoing embodiment of the present invention operates as follows.

The operator turns a handle (not shown) attached to the body (not shown) of the drill stand for confirmation that the center of the drilling tool 36 coincides with a punch mark 52 previously located on a workpiece 51. As the hollow shaft descends, the engaging member 41 moves away from the pin 38 supported by the outer cylinder 23. However, since the ball 44 is engaged with groove 40 under the resilient action of the spring 43, engaging member 41 will not ascend within shaft 35 as long as the resilient force of the spring 43 is larger than the force produced by biasing the lower end of the pilot pin 47 upon the workpiece 51. As a result, oil cannot flow out of oil reservoir 55.

On alignment of the lower end of the pilot pin 47 with the punch mark 52, the hollow shaft 35 may be further forced down by the operator for drilling. Ball 44 is then forced out of groove 40 against the action of spring 43, and is forced up shaft 35, following movement of the pilot pin 47 upward. As a consequence, oil may flow from oil reservoir 55 past the engaging member 41 and through ring 39 into groove 50 located in the side wall of the pilot pin 47. The oil thus permitted to drip down the pilot pin is applied over the portion of the workpiece being drilled by the centrifugal force produced through rotation of the hollow shaft 35.

When the shaft 35 ascends after completion of drilling, the spring 45 is once again compressed between the pin 38 and the engaging member 41. The engaging member 41 is forced down by the resulting compressing force, so that the ball 44 again engages with internal groove 40 for the next centering. Further ascension of the shat 35 causes oil feed opening 23a formed in the outer cylinder 23 to be closed by the side wall of the hollow shaft 35 and thus shut off the flow of oil from the oil tank 30 into the oil reservoir 55.

As mentioned above, during centering of the drilling tool on the punch mark provided on the workpiece, it is possible according to the present invention to prevent the easy disengagement of the pilot due to the bias of the lower end of the pilot pin against the workpiece. Additionally, repeated centering of the pilot pin can be effected without experiencing the formation of oil droplets on the workpiece, since the flow of cutting oil ceases upon vertical movement of the shaft 35 upward. Accordingly, centering of a drill can accurately be carried out within a short period of time according to the present invention, leading to improvements in the efficiency of drilling and prevention of undue oil loss.

We claim:

1. A drilling machine comprising:
   a hollow shaft, mounted for reciprocal vertical and rotational travel between a lower working position and an upper resting position;
   an annular cutter mounted to said hollow shaft for rotational and vertical movement in unison with said hollow shaft;
   a pilot pin axially mounted within said annular cutter for independent vertical reciprocal movement from an upper unrestrained position to a lower locked position, relative to said hollow shaft and said annular cutter, said pilot pin having a head portion and a shank portion, said shank portion having a groove extending from a lower portion to an upper portion spaced from said head portion, thereby forming an upper shank portion without a groove;
   an engaging member separate from said pilot pin and disposed within said hollow shaft, said engaging member being biasable against said head portion of said pilot pin by a first spring means having one end fixed in place, said engaging member thereby following the reciprocal vertical movement of said pilot pin from an upper unrestrained position to a lower locked position, said engaging member being biased against said head portion of said pilot pin only during said reciprocal vertical movement of said pilot pin or when said pilot pin is in said upper unrestrained position;
   an internal oil reservoir within said hollow shaft adapted to be automatically supplied with oil by an external oil supply means;
   said oil flowing from said internal oil reservoir past said engaging member and down said pilot pin when said engaging member and said pilot pin are in an upper position, and said hollow shaft and annular cutter are in said lower working position;
   said engaging member being seated on a ring and substantially blocking the flow of oil down said pilot pin when said engaging member is in its lower position, said engaging member including a horizontal cavity alignable with an annular depression in the inner wall of said hollow shaft when said engaging member is in its lower position;
   a ball received in said horizontal cavity and biased outwardly by a second spring means, said ball being extendible by said second spring means to a position within said annular depression when said horizontal cavity is aligned therewith, said position maintaining said ball partially within each of said cavity and said annular depression, thereby releasably locking said engaging member to said hollow shaft to maintain said pilot pin in said lower locked position while centering said drilling machine and to substantially block the flow of oil down said pilot pin when in said lower locked position.

2. The drilling machine of claim 1 wherein said horizontal cavity is open at one end only.

3. The drilling machine of claim 1 wherein said depression comprises an internal continuous groove within said hollow shaft.

4. The drilling machine of claim 1 wherein said external oil supply means communicates with said internal oil reservoir through an oil passageway for the automatic supply of oil thereto, said oil passageway being closed by said hollow shaft when said shaft is in an upper position.

* * * * *